United States Patent
Pala et al.

(10) Patent No.: US 6,891,135 B2
(45) Date of Patent: May 10, 2005

(54) HIGH TEMPERATURE SHUT-OFF FOR AN LCD HEATER

(75) Inventors: Silviu Pala, Birmingham, MI (US); Scott Heflin, Waterford, MI (US); Christopher Arms, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 28 days.

(21) Appl. No.: 10/316,303

(22) Filed: Dec. 11, 2002

(65) Prior Publication Data

US 2004/0112889 A1 Jun. 17, 2004

(51) Int. Cl.$^7$ .......................... H05B 1/02; G02F 1/133
(52) U.S. Cl. ................... 219/494; 219/209; 349/161
(58) Field of Search .................. 219/494, 543–544, 219/209, 510, 517; 349/161

(56) References Cited

U.S. PATENT DOCUMENTS

| | | |
|---|---|---|
| 4,773,735 A | 9/1988 | Ukrainsky et al. |
| 5,088,806 A | 2/1992 | McCartney et al. |
| 5,523,873 A | 6/1996 | Bradford, III et al. |
| 5,559,614 A | 9/1996 | Urbish et al. |
| 5,655,305 A | 8/1997 | Fletcher |
| 5,744,819 A | 4/1998 | Yamamoto et al. |
| 5,818,010 A | 10/1998 | McCann |
| 5,920,366 A | 7/1999 | Dehmlow et al. |
| 6,089,751 A | 7/2000 | Conover et al. |
| 6,157,528 A | 12/2000 | Anthony |
| 6,303,911 B1 | 10/2001 | Welch, Jr. |
| 6,309,099 B1 | 10/2001 | Chang |
| 6,309,100 B1 | 10/2001 | Lutnaes |
| 6,335,717 B2 | 1/2002 | Hasegawa et al. |
| 6,404,421 B1 | 6/2002 | Meijler et al. |
| 6,535,266 B1 * | 3/2003 | Nemeth et al. ............. 349/161 |
| 2003/0011735 A1 * | 1/2003 | Kato .......................... 349/149 |

FOREIGN PATENT DOCUMENTS

| | | | |
|---|---|---|---|
| GB | 1445839 | * | 8/1976 |
| JP | 01059329 | | 3/1989 |
| JP | 3-179484 | * | 8/1991 |
| JP | 4-1723 | * | 1/1992 |
| JP | 5-53093 | * | 3/1993 |
| JP | 5-257109 | * | 10/1993 |
| JP | 6-11689 | * | 1/1994 |
| JP | 06011689 | | 1/1994 |
| JP | 11-219612 | * | 8/1999 |
| JP | 2000-163024 | * | 6/2000 |
| JP | 2000164376 | | 6/2000 |
| JP | 2000-164376 | * | 6/2000 |

* cited by examiner

*Primary Examiner*—John A. Jeffery
(74) *Attorney, Agent, or Firm*—Harness, Dickey & Pierce, PLC

(57) ABSTRACT

A main heater controller is adapted to control operation of the LCD heater. A temperature controlled override switch is adapted to disable the LCD heater, independent of the main heater controller, upon a temperature reaching a shut-off temperature above a normal operating temperature of the LCD. The temperature controlled switch has a current flow path made of a material whose conductivity is a function of temperature. A cavity in which the temperature controlled switch is located is also provided. The cavity is adapted to transfer heat in air emanating from the LCD heater to the temperature controlled switch.

14 Claims, 3 Drawing Sheets

HIGH TEMPERATURE SHUT-OFF FOR AN LCD HEATER

FIELD OF THE INVENTION

The present invention relates to a controller for an LCD heater, and more particularly, to a controller with a high temperature shut-off.

BACKGROUND OF THE INVENTION

Liquid crystal displays (LCDs) have found widespread usage generally. LCD's have been employed in applications subject to significant temperature variations, including automobiles and airplanes. An LCDs performance is temperature-dependant, and in particular, performs poorly at low temperatures. Thus, heaters have been provided in LCD devices to raise the temperature of the LCD to achieve satisfactory functionality. The heaters have included LCD temperature sensors connected to a microprocessor which controls a switch to modulate the heater and maintain the LCD at a satisfactory operating temperature.

The microprocessor has also included logic to shut down the operation of the heater completely, if the temperature of the LCD becomes excessively elevated. Thus, a back-up mechanism has been provided to prevent overheating which might damage the LCD. One disadvantage of this back-up mechanism is it relies on the same microprocessor that is controlling the already malfunctioning heater control. Consequently, if the cause of the heater control malfunction is a failure of the microprocessor (or some other functional control component), it may also fail to activate the high temperature shut-off.

SUMMARY OF THE INVENTION

In accordance with one aspect of the present invention an LCD with a high temperature shut-off for an LCD heater to protect against run-away heating includes a main heater controller adapted to control operation of the LCD heater. A temperature controlled override switch is adapted to disable the LCD heater, independent of the main heater controller, upon a temperature reaching a shut-off temperature.

In accordance with another aspect of the present invention, the LCD with a high temperature shut-off for an LCD heater further includes a cavity in which the temperature controlled switch is located. The cavity is adapted to transfer heat in air emanating from the LCD heater, directly or indirectly, to the temperature controlled switch.

In accordance with yet another aspect of the present invention, an LCD with a high temperature shut-off for an LCD heater includes an LCD panel adjacent the LCD heater. A temperature controlled switch is located in thermally conductive relationship to the LCD panel. The temperature controlled switch has a current flow path made of a material whose conductivity is a function of temperature. The temperature controlled switch is adapted to disrupt the current flow path to disable the LCD heater upon the LCD reaching a shut-off temperature above a normal operating temperature of the LCD.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
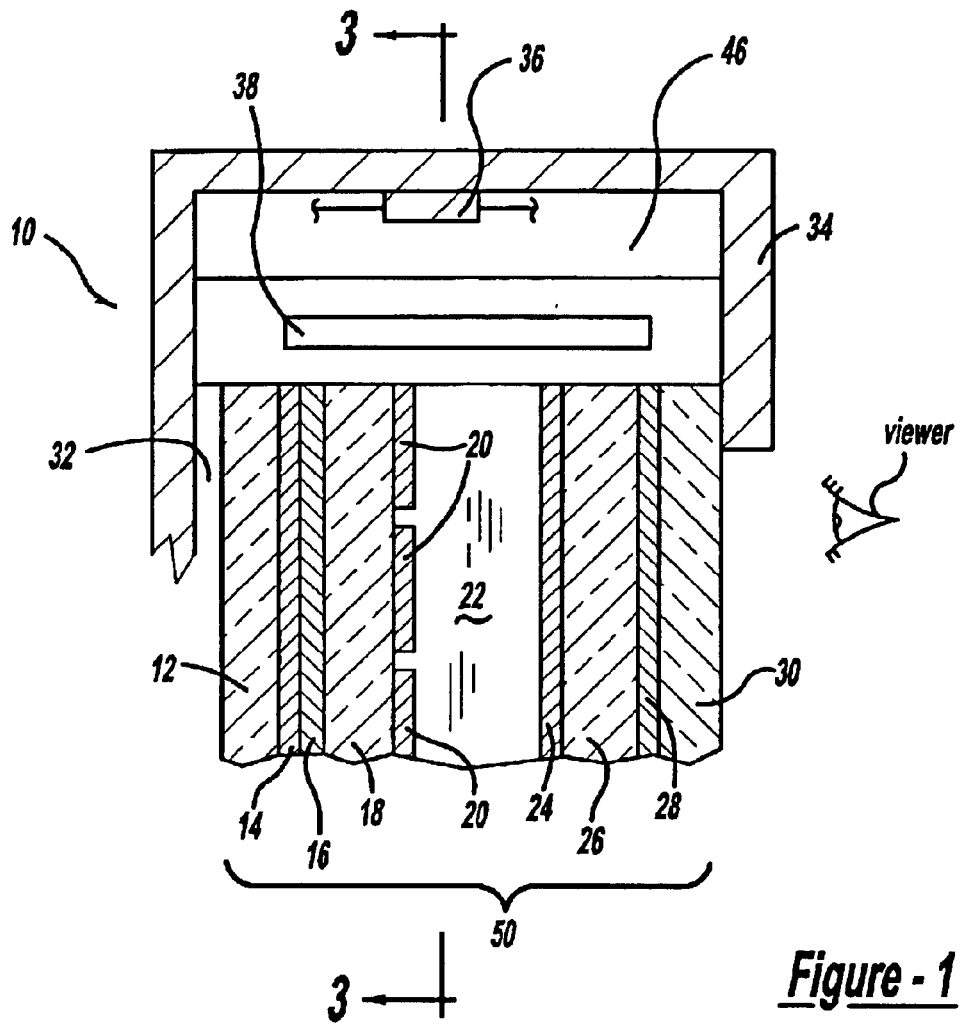
FIG. 1 is a diagrammatic, fragmentary, cross-sectional view of a preferred embodiment of an LCD with a high temperature shut-off for an LCD heater according to the present invention.

Referring to FIG. 1, the display panel of a heated liquid crystal display 10 generally includes, from the rear forward toward the viewer, a rear transparent glass cover sheet or substrate 12 and a conductive heating layer 14 deposited thereon. The conductive heating layer 14 is preferably made of substantially transparent indium-tin-oxide (ITO), and is preferably vapor deposited on the transparent cover sheet 12. Next is a rear polarizer 16 adjacent one side of a rear transparent glass substrate 18 and individual pixel electrodes 20 adjacent the other side thereof. Next the LCD includes the liquid crystal layer 22 with a common electrode 24 adjacent one side of a front transparent glass substrate 26 and a front polarizer 28 adjacent the other side thereof. Finally, a front glass cover sheet 30 or substrate is included.

In addition to the LCD panel components described above, the liquid crystal display 10 also typically includes a backlight (not shown) in the space 32 behind the LCD panel 50 and a housing 34 for the above-described components. In addition, a sensor 36 (which in this case is a combined sensor and switch) and vents 38 are provided in the housing 34. The sensor 36 and vents 38 are related to a heater control system as described more fully hereinafter.

Figure 2:
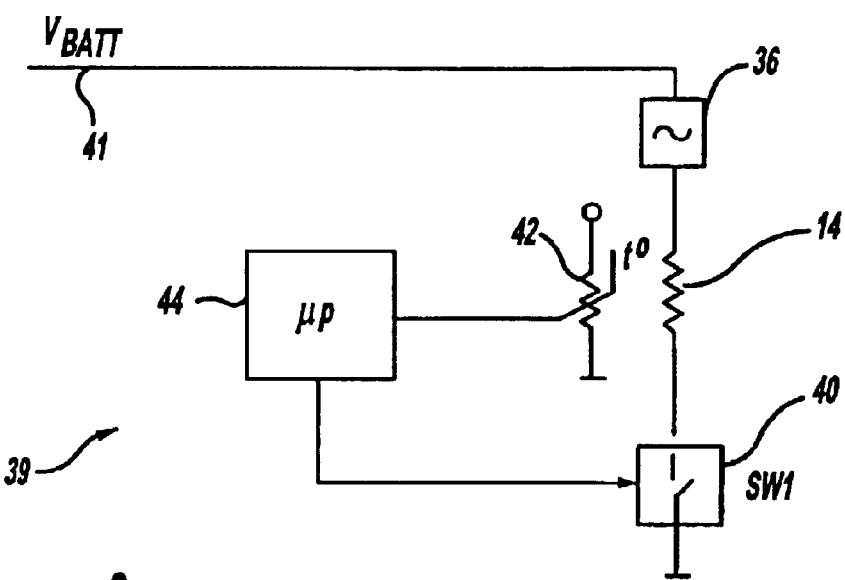
FIG. 2 is a preferred circuit diagram with the high temperature shut-off of the embodiment of FIG. 1.

Referring to FIG. 2, a heater control circuit, generally indicated as 39, is illustrated. A power supply 41 is connected in series to a serial temperature controlled switch 36, a LCD heater 14 and a main heater switch 40. A second temperature sensor 42, preferably a thermistor, is located adjacent the heater 14. This sensor 42 is typically located on the glass substrate 12 in contact with the LCD panel. The sensor 42 provides data to the microprocessor 44 or main controller. The microprocessor 44 includes logic to modulate the sensed temperature to maintain the temperature within a desired operating temperature range, where the LCD performs satisfactorily. Power to the microprocessor 44 and the thermistor 42 is provided separately from the power supply 41.

The main controller may be any appropriate logic control mechanism. For example, the main controller is optionally a microprocessor 44, a logic circuit or other logic control mechanism. As used herein, however, the term "main controller" does not include switch components and sensors which are related to the logic control mechanism but not part of the logic control mechanism per se. For example, in the illustrated embodiments the main control switch 40, 140, the sensor 42, 142, the temperature controlled switch 36, 136 and the second switch 143 are not part of the main controller, since they merely provide data to, or are operated by the main controller.

The serial temperature controlled switch 36 is adapted to prevent overheating which might damage the LCD panel 50 or other components of the LCD device 10 (such as the housing 34). This serial temperature controlled switch 36 operates independently of the other control components of the heater circuit 40 (i.e., the sensor 42, the microprocessor 44 and the main control switch 40). Thus, even if one or more of these heater control components 40, 42, 44 fails, the serial temperature controlled switch 36 will continue to function properly.

The serial temperature controlled switch 36 is adapted to trip, thereby disabling the heater 14, upon detecting a temperature above a shut-off temperature. As used herein, to "disable" the heater 14 means to reduce the thermal output of the heater 14 to a point at which the temperature of the LCD panel 50 begins to decrease. The heater 14 is preferably disabled by reducing the power supplied to the heater 14 substantially; more preferably by at least about 75 percent; and even more preferably, by at least about 90 percent. It is also preferred that the heater 14 be turned completely off upon the shut-off temperature being reached by disrupting all current flow to heater 14.

The detected temperature above the shut-off temperature is alternatively a temperature of the temperature controlled switch 36, of the air inside the cavity 46, of the LCD panel 50, or of some of other component of the LCD 10. The shut-off temperature (or the temperature at which the heater 14 is disabled) of the serial controlled temperature switch 36 is preferably less than about 80° C.; more preferably, less than about 65° C.; and even more preferably, less than about 50° C. In addition, the shut-off temperature of the serial controlled temperature switch 36 is preferably greater than about 10° C; more preferably, greater than about 20° C.; and even more preferably, greater than about 30° C.

A preferred temperature controlled switch 36 is a polymeric temperature controlled switch (PTS). This PTS switch 36 is preferred for several reasons. First, it is extremely simple, and thus, quite resistant to failure. One preferred PTS switch 36 is a matrix of a crystalline organic polymer matrix containing dispersed conductive particles, typically carbon black. In its cooled state, the material is mostly crystalline, with the conductive particles being forced into the amorphous regions between the crystallites. A sufficient ratio of the conductive particles is included in the material so that the conductive particles touch, or nearly touch in this cooled crystalline state. Thus, a three dimensional conductive network forms through the material enabling current flow therethrough. In effect, the PTS material operates as a switch placed in an "on" position.

When the material is heated to the melting point of the polymer, the crystallites melt and become amorphous. This increases the volume of the amorphous phase, disrupting the conductive network, and consequently, the conductive path through the material. Since the melting of the polymer occurs over a relatively narrow temperature range, the conductive network path disruption also occurs over a relatively narrow temperature range. Thus, at and above this melting temperature the PTS operates as a switch in an "off" position, although there may still be some minimal current flow therethrough.

As the polymer cools, the conductive network again forms to provide the conductive path. This reduces the resistance of the material and allows current once again to flow freely through the material. Thus, upon cooling of the material, the PTS operates as a switch 36 which has been moved back into an "on" position. The PTS switch trips as a function of temperature and current. The PTS switch trips at a low temperature and a relatively high current and at a high temperature and a relatively low current. Between the high and low temperatures, the PTS switch trips between the lower and higher currents. For example, the PTS switch may be designed to trip at about 60° C. when exposed to a 0.5 amp current, and at about 0° C. when exposed to a 1.5 amp current. Thus, if the function is linear, the PTS switch will trip at about 30° C. when exposed to the 1.0 amp current typical of an ITO heater. One particularly preferred PTS switch is manufactured by Tyco Electronics under the trade name Raychem Circuit Protection and identified as a polymeric positive temperature coefficient (PPTC) over current protection device.

In addition, the PTS switch 36 has its own self-supporting structure, independent of the LCD panel 50 which is preferred. Thus, it does not need to be located on the glass of the LCD panel 50 where space is at a premium. Also, since it is not located on the glass, the difficulties of providing an electrical connection therewith are avoided. The PTS switch 36 is simply placed in line between the power supply and the ITO heater 14 and located where it is in thermally conductive relationship with the heated LCD panel 50. The thermally conductive relationship may include direct physical contact or not. Thus, heat emanating from the heated LCD panel 50 (including the ITO heater 14) is transmitted to the switch 36.

Figure 3:
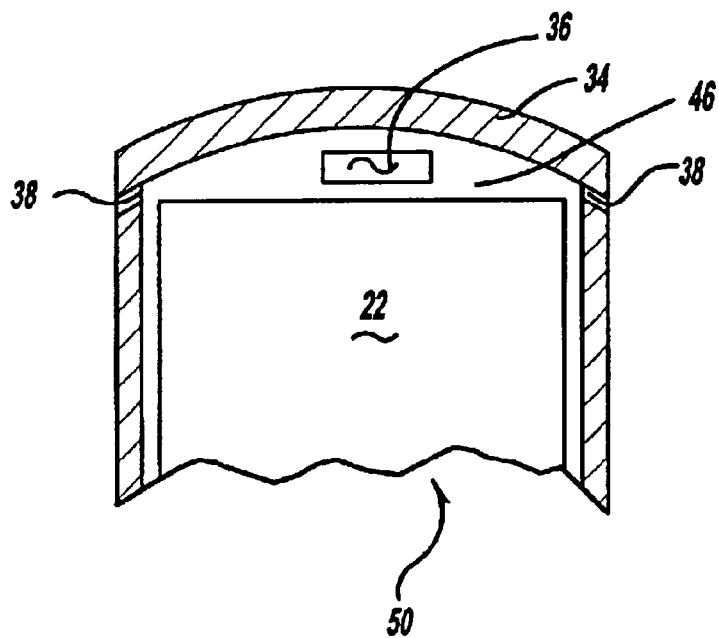
FIG. 3 is a diagrammatic, fragmentary, cross-sectional view, taken along line 3—3 of FIG. 1.

Referring to FIGS. 1 and 3, the LCD 10 includes a housing 34 around the LCD panel 50. The housing 34 includes a cavity 46 in which the PTS 36 is located. The cavity 46 is adapted to collect heat emanating from the heated LCD panel 50 and make that heat available for detection by and/or transmission to the switch 36. In addition, the cavity 46 is adapted to subject the PTS 36 to the temperature of air emanating from the heated LCD panel 50 without the temperature of the air being meaningfully reduced. Preferably, the temperature of the air contacting the sensor is no more than about 10° C. less than the temperature of the LCD panel 50, the LCD heater 14, or both; more preferably, no more than about 5° C. less; and even more preferably, no more than about 2° C. less.

In this case the heated air emanating from the LCD panel 50 rises inside the housing 34, the hotter air replaces the cooler air at the top of the cavity 46. This cooler air is permitted to flow out of the vents 38 below the switch 36. Thus, the switch 36 is located in the cavity above the LCD panel 50. In addition, the switch 36 is preferably located above any air exit vents 38 of the vent system for the cavity 46, more preferably, above at least about 75% of the cross-sectional area of any vents 38 in the cavity 46 allowing the escape of heated air from the LCD components; more preferably, above at least about 90% of the cross-sectional area of such vents 38; and even more preferably above all of the cross-sectional area of such vents 38. In addition, the cavity 46 preferably includes at least a portion which is located above the LCD panel 50; more preferably, the portion above the LCD panel 50 is adapted to collect substantially all of the air rising from the top of the LCD panel 50. Further, the temperature controlled switch 36 is preferably located in the portion of the cavity 46 above the LCD panel 50.

Figure 4:
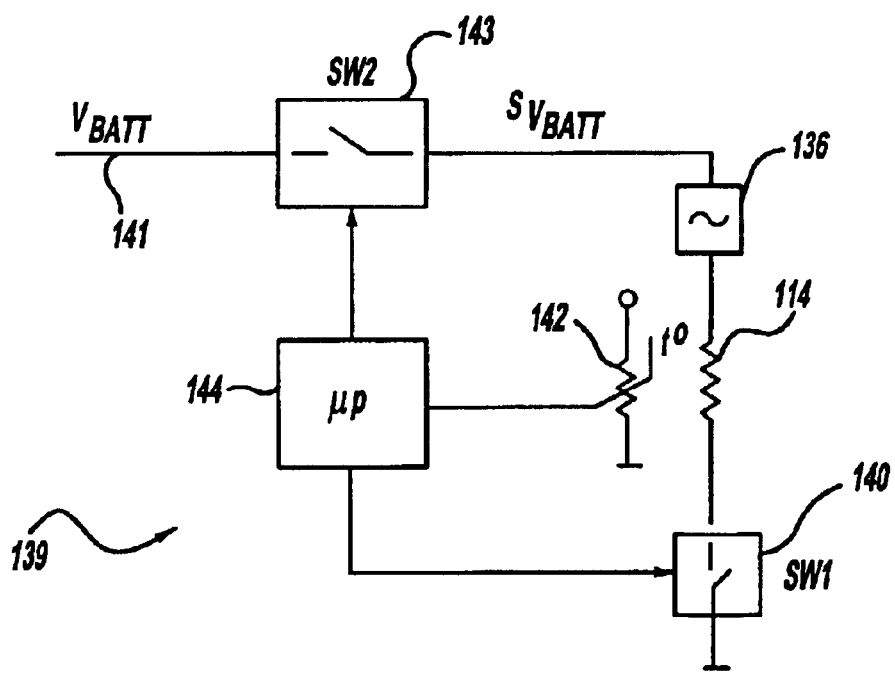
FIG. 4 is an alternative preferred circuit diagram, similar to FIG. 2.

Referring to FIG. 4, an alternative preferred embodiment of a control circuit 139 of the present invention is provided. As with the control circuit 39 of FIG. 2, this control circuit 139 includes a power supply 141, PTS switch 136, ITO heater 114, thermistor 142, microprocessor 144 and microprocessor controlled switch 140. In addition, a second microprocessor controlled switch 143 is provided and the microprocessor 144 of this control circuit 139 additionally includes logic to control this additional switch 143. Switch 143 is controlled so that it opens the circuit when the ignition of the vehicle is turned off and closes when the ignition is turned on. Thus, any power leakage which may be lost by having the battery 141 directly connected to the heater 114 when the ignition is off can be eliminated.

In addition, the microprocessor 144 of this embodiment includes logic to control this additional switch 143 to open, thereby turning the power to the heater 114 off, when the thermistor 142 detects an excessively high temperature. In this case, the temperature of the heated LCD panel 150 when the PTS switch 136 trips is designed to be higher than the temperature of the heated LCD panel 150 when this additional switch 143 trips in response to an excessively elevated temperature. Thus, if a separate microprocessor controlled high temperature shut-off switch 143 is provided as with this embodiment, the serial temperature controlled switch 136 preferably disables the heater at a temperature of the LCD panel 150 that is at least about 5° C. greater than the shut-off temperature of this separate switch 143; more preferably, at least about 10° C. greater; and even more preferably at least about 15° C. greater.

Figure 5:
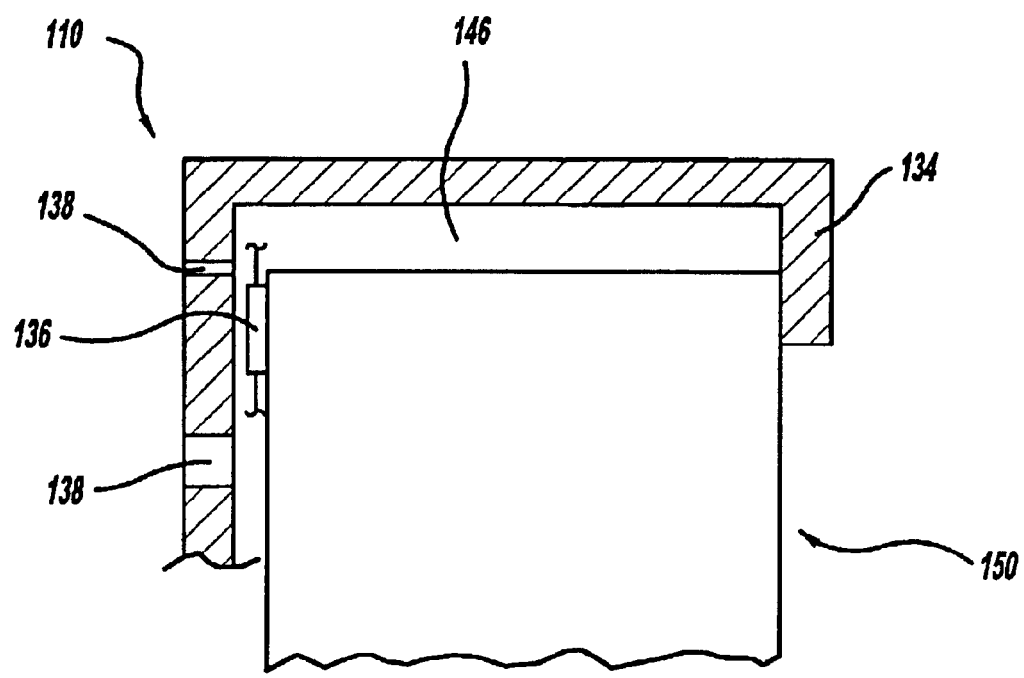
FIG. 5 is a diagrammatic, fragmentary, cross-sectional view, similar to FIG. 1 (but without illustrating the details of the LCD panel), of an alternative preferred LCD with a high temperature shut-off which incorporates the alternative preferred circuit of FIG. 4.

Referring to FIG. 5, the alternative preferred control circuit 139 of FIG. 4 may be used in connection with the illustrated LCD 110. In this case, the switch 136 is located within the cavity 146, but the thermally conductive relationship is provided by also locating the switch 136 in direct physical contact with the at least one of the components of the LCD panel 150. In addition, the heated air emanating from the LCD panel 150 passes by the sensor 136 prior to exiting the cavity 146 via the vent system 138. Consequently, the switch 136 is completely surrounded by substances which are heated to about the same temperature as the LCD panel 150 (surrounded on one side by the heated LCD panel 150 and on the other three sides by the heated air of the cavity 146).

The preferences mentioned above with respect to the differences between the LCD panel 150 temperature and the heated air temperature in contact with the switch 136 also apply with respect to this embodiment. Similarly, although the switch 136 is not located above the upper surface of the LCD panel 150, the heated air is directed to provide a good thermally conductive relationship between the LCD panel 150 and the switch 136, even without the direct physical contact. Further, the preferences mentioned above with respect to the location of the switch 136 in relation to the vents 138 is also applicable here.

Of course, many modifications may be made to the previously described preferred embodiments. For example, in such an alternative a variable controlled power supply is used in controlling the normal operation of the heater rather than modulating the main switch 40, 140. As another alternative, the switch 36, 136 is located in physical contact with the LCD panel and without a cavity which includes space beyond that sufficient to house the switch 36, 136. For example, the switch 36, 136 may be located between glass components or between the LCD panel and the housing. As yet another alternative, the switch 36, 136 is a thermistor located on a glass substrate of the LCD panel with its own controller. It should also be understood that the temperature controlled switch 36, 136 of the above-described embodiments is an integrally combined switch and sensor. Thus, when reference is made herein to this temperature controlled switch 36, 136, it is understood to include both of these switch components (i.e., the switch and sensor component). Thus, when the temperature controlled switch is said to be located in a particular location or relationship, it is understood that only one of the switch or sensor components need be so positioned.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An LCD with a high temperature shut-off for an LCD heater to protect against run-away heating, comprising:
   a main heater controller adapted to control operation of the LCD heater; and
   a temperature controlled override switch positioned in a housing at a location exposed to heat rise from the LCD and LCD heater, the temperature controlled override switch adapted to disable the LCD heater, independent of the main heater controller, upon a temperature sensor reaching a shut-off temperature, wherein the temperature controlled switch is electrically connected in series with a power supply and the LCD heater, and is not electrically connected to any other component.

2. An LCD according to claim 1, wherein the temperature controlled override switch is further adapted to disable the LCD heater independent of any temperature sensor providing temperature information to a controller.

3. A high temperature shut-off according to claim 1, further comprising an LCD panel in thermally conductive relationship with the LCD heater, and wherein the temperature controlled switch is located in thermally conductive relationship with the LCD heater such that a temperature of the temperature controlled switch is less than about 10° C. less than a temperature of the LCD heater, the LCD panel, or both.

4. An LCD according to claim 1, further comprising a housing surrounding an LCD panel and the LCD heater, and wherein the temperature controlled switch is located within a cavity of the housing, the cavity being adapted to transfer heat emanating from the LCD panel, the LCD heater, or both, to the temperature controlled switch.

5. A high temperature shut-off according to claim 1, wherein the temperature controlled switch is in physical contact with an LCD panel including the LCD heater.

6. A high temperature shut-off according to claim 1, wherein the temperature controlled switch is adapted to operate in direct response to temperature changes to the temperature controlled switch, without the use of a controller.

7. An LCD with a high temperature shut-off for an LCD heater to protect against run-away heating, comprising:
   a main heater controller adapted to control operation of the LCD heater; and
   a temperature controlled override switch positioned in a housing at a location exposed to heat rise from the LCD and LCD heater, the temperature controlled override switch adapted to disable the LCD heater, independent of the main heater controller, upon a temperature sensor reaching a shut-off temperature, wherein the temperature controlled switch is electrically connected in series with a power supply and the LCD heater, and is not electrically connected to any other component, wherein a current flow path through the temperature controlled switch has a conductivity which is adapted to change as a function of temperature to disable the LCD heater.

8. An LCD with a high temperature shut-off for an LCD heater to protect against runaway heating, comprising:
   an LCD panel adjacent the LCD heater;
   a temperature controlled switch located in thermally conductive relationship to the LCD panel and positioned in a housing at a location exposed to heat rise from the LCD panel and the LCD heater, the temperature controlled switch having a current flow path made of a material whose conductivity is a function of temperature, the switch being adapted to disrupt the current flow path to disable the LCD heater upon the LCD reaching a shut-off temperature above a normal operating temperature of the LCD, wherein the housing has a vent system for the cavity with a total cross-sectional area, and at least 75 percent of the total cross sectional area is located above the temperature controlled switch.

9. An LCD with a high temperature shut-off for an LCD heater to protect against runaway heating, comprising:
   a main heater controller adapted to control operation of the LCD heater;
   a temperature controlled switch adapted to disable the LCD heater, independent of the main heater controller, upon a temperature reaching a shut-off temperature, wherein the temperature controlled switch is electrically connected in series with a power supply and the LCD heater, and is not electrically connected to any other component; and
   a cavity adapted to transfer heat in air emanating from the LCD heater to the temperature controlled switch, the temperature controlled switch being located within the cavity at a location exposed to heat rise from the LCD and the LCD heater.

10. An LCD according to claim 9, wherein a current flow path through the temperature controlled switch has a conductivity which changes as a function of temperature to disable the LCD heater.

11. An LCD according to claim 9, further comprising an LCD panel in thermally conductive relationship with the LCD heater, and wherein the temperature controlled switch is in physical contact with the LCD panel, the LCD heater, or both.

12. An LCD according to claim 9, wherein the temperature controlled switch is adapted to operate in direct response to temperature changes to the temperature controlled switch, without the use of a controller to disable the LCD heater.

13. An LCD with a high temperature shut-off for an LCD heater to protect against runaway heating, comprising:
   a main heater controller adapted to control operation of the LCD heater;
   a temperature controlled switch adapted to disable the LCD heater, independent of the main heater controller, upon a temperature reaching a shut-oft temperature; and
   a cavity adapted to transfer heat in air emanating from the LCD heater to the temperature controlled switch, the temperature controlled switch being located within the cavity at a location exposed to heat rise from the LCD and the LCD heater, wherein the cavity has a vent system with a total cross-sectional area, and at least 75 percent of the total cross sectional area is located below the temperature controlled switch.

14. An LCD with a high temperature shut-off for an LCD heater to protect against runaway heating, comprising:
   a main heater controller adapted to control operation of the LCD heater;
   a temperature controlled switch adapted to disable the LCD heater, independent of the main heater controller, upon a temperature reaching a shut-off temperature; and
   a cavity adapted to transfer heat in air emanating from the LCD heater to the temperature controlled switch, the temperature controlled switch being located within the cavity at a location exposed to heat rise from the LCD and the LCD heater, wherein said cavity is defined by a housing, said housing comprising a unitary structure having a pair of laterally offset walls extending toward the LCD from a transverse wall, said transverse wall having said temperature controlled switch disposed thereon wherein said lateral walls offset said transverse wall and said temperature controlled switch a predetermined distance from said LCD to accommodate said heat rise from said LCD to said temperature controlled switch.

* * * * *